United States Patent
Hu et al.

(10) Patent No.: US 10,690,122 B2
(45) Date of Patent: Jun. 23, 2020

(54) METHOD OF OSMOTIC ENERGY HARVESTING USING RESPONSIVE COMPOUNDS AND MOLECULES

(71) Applicants: King Abdullah University of Science and Technology, Thuwal (SA); Nanyang Technological University, Singapore (SG)

(72) Inventors: Xiao Hu, Singapore (SG); Yufeng Cai, Singapore (SG); Zhiping Lai, Thuwal (SA); Yujiang Zhong, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/066,386

(22) PCT Filed: Jan. 19, 2017

(86) PCT No.: PCT/IB2017/050292
§ 371 (c)(1),
(2) Date: Jun. 27, 2018

(87) PCT Pub. No.: WO2017/125877
PCT Pub. Date: Jul. 27, 2017

(65) Prior Publication Data
US 2019/0003465 A1    Jan. 3, 2019

(30) Foreign Application Priority Data
Jan. 20, 2016  (SG) ............................ 10201600442R

(51) Int. Cl.
*F03G 7/00* (2006.01)
*B01D 61/00* (2006.01)
(Continued)

(52) U.S. Cl.
CPC ........... *F03G 7/005* (2013.01); *B01D 61/002* (2013.01); *B01D 61/005* (2013.01); *B01D 61/44* (2013.01);
(Continued)

(58) Field of Classification Search
CPC .......... F03G 7/005; F03B 17/06; F24S 90/00; F24T 50/00; B01D 61/44; B01D 61/005; B01D 61/002; B01D 61/58; Y02E 10/10
(Continued)

(56) References Cited

U.S. PATENT DOCUMENTS

2006/0225420 A1    10/2006   Al-Mayahi et al.
2010/0024423 A1*    2/2010   McGinnis ............... F03G 7/005
                                                                60/649
(Continued)

OTHER PUBLICATIONS

Fernanda, et al., "Osmotic power with Pressure Retarded Osmosis:Theory, performance and trends—A review", Journal of Membrane Science, 2014, 337-358.
(Continued)

*Primary Examiner* — Hoang M Nguyen
(74) *Attorney, Agent, or Firm* — Billion & Armitage; Gregory S. Schwartz

(57) ABSTRACT

The present invention discloses and claims a more efficient and economical method and system for osmotic energy production and capture using responsive compounds and molecules. The present invention is an energy harvest system enabled by stimuli responsive draw solutions that are competent in terms of energy production, geographic location flexibility, and the affordable, efficient and economical production and delivery of osmotic power. Specifically, the present invention is a novel osmotic power system that uses stimuli responsive draw solutions, economically feasible larger permeable membranes, and low grade heat sources to deliver osmotic power more efficiently and economically (Continued)

with less negative environmental impact, greater power output, and located in more geographically diverse areas of the world than previously thought possible for supporting such a power source.

20 Claims, 10 Drawing Sheets

(51) Int. Cl.
    *B01D 61/44*     (2006.01)
    *B01D 61/58*     (2006.01)
    *F24T 50/00*     (2018.01)
    *F24S 90/00*     (2018.01)
    *F03B 17/06*     (2006.01)

(52) U.S. Cl.
    CPC .............. *B01D 61/58* (2013.01); *F03B 17/06* (2013.01); *F24S 90/00* (2018.05); *F24T 50/00* (2018.05); *Y02E 10/10* (2013.01)

(58) Field of Classification Search
    USPC ............... 60/648, 649; 210/170.11, 258, 640
    See application file for complete search history.

(56) References Cited

U.S. PATENT DOCUMENTS

| | | | |
|---|---|---|---|
| 2011/0272355 A1* | 11/2011 | Rajagopalan | B01D 11/0446 210/650 |
| 2012/0012511 A1* | 1/2012 | Kim | B01D 61/002 210/170.11 |
| 2014/0124443 A1* | 5/2014 | McGinnis | B01D 61/002 210/640 |

OTHER PUBLICATIONS

Hoeven, "World Energy Outlook", International Energy Agency, 2011, 1-666.
Logan, et al., "Membrane-based processes for sustainable power generation using water", Review, vol. 488, Aug. 16, 2012, 313-319.
McGinnis, et al., "A novel ammonia-carbon dioxide osmotic heat engine for power generation", Science Direct, Journal of Membrane Science, 2007, 13-19.
Ramon, et al., "Membrane-based production of salinity-gradient power", Energy & Environmental Science, The Royal Society of Chemistry, 2011, 4423-4434.
Shihong, et al., "Thermodynamic limits of extractable energy by pressure retarded osmosis", Energy & Environmental Science, The Royal Society of Chemistry, 2014, 2706-2714.

* cited by examiner

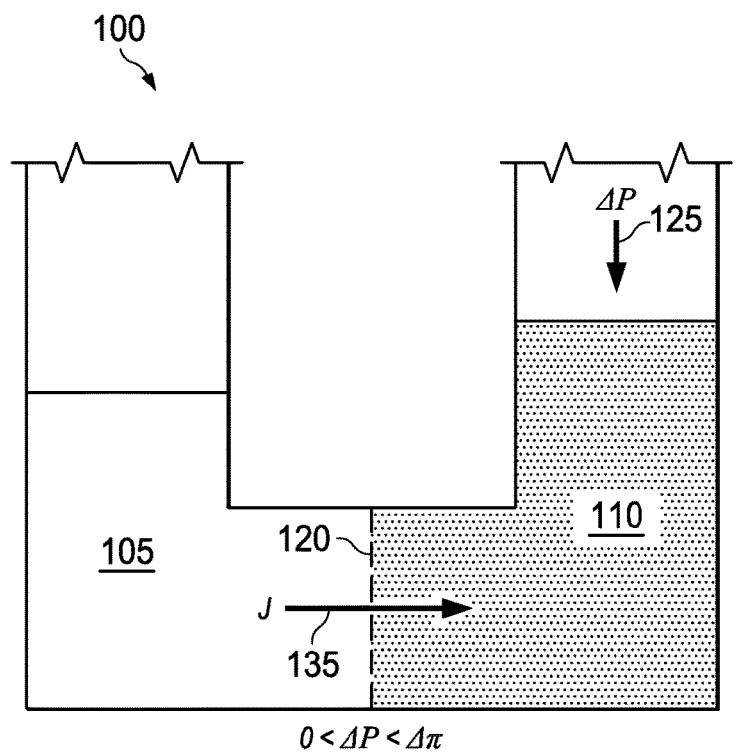
FIG. 1
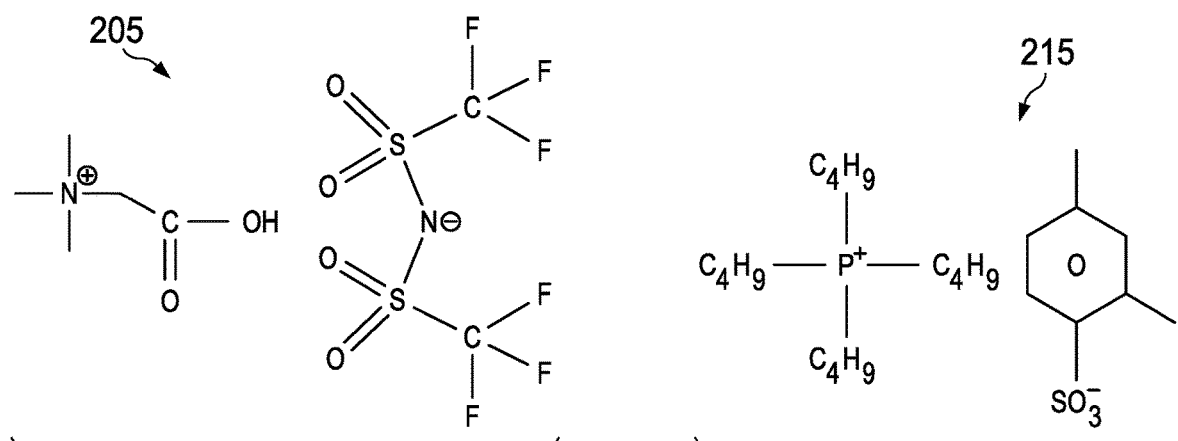
FIG. 2A
FIG. 2B

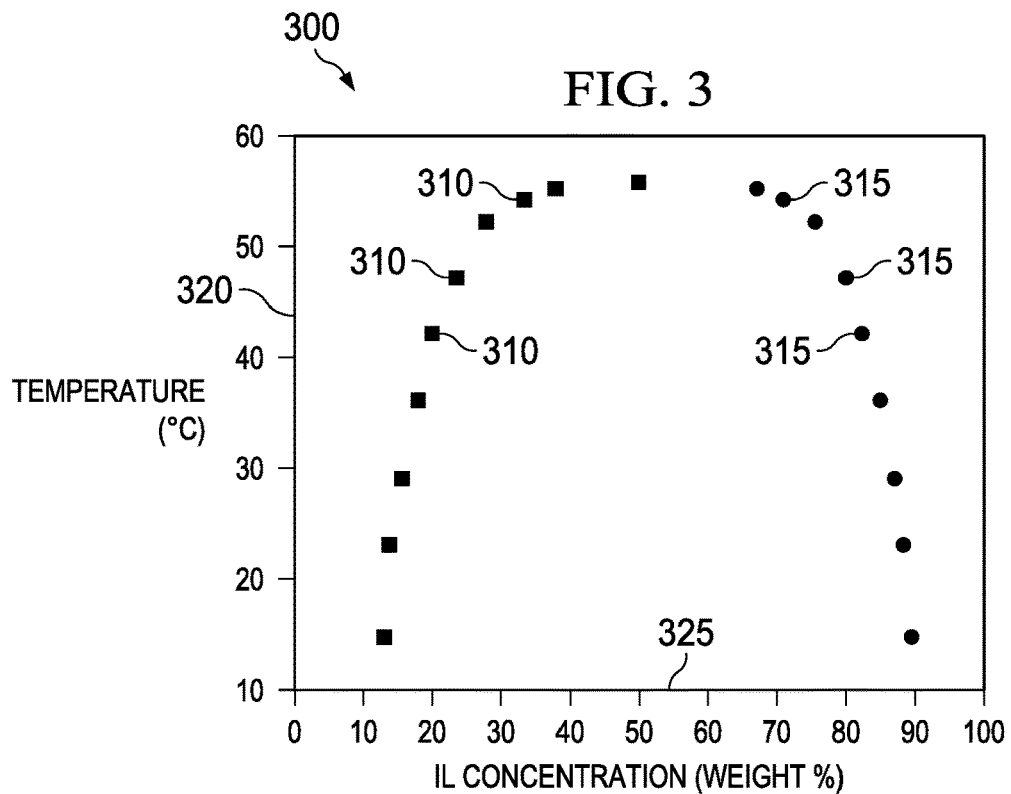
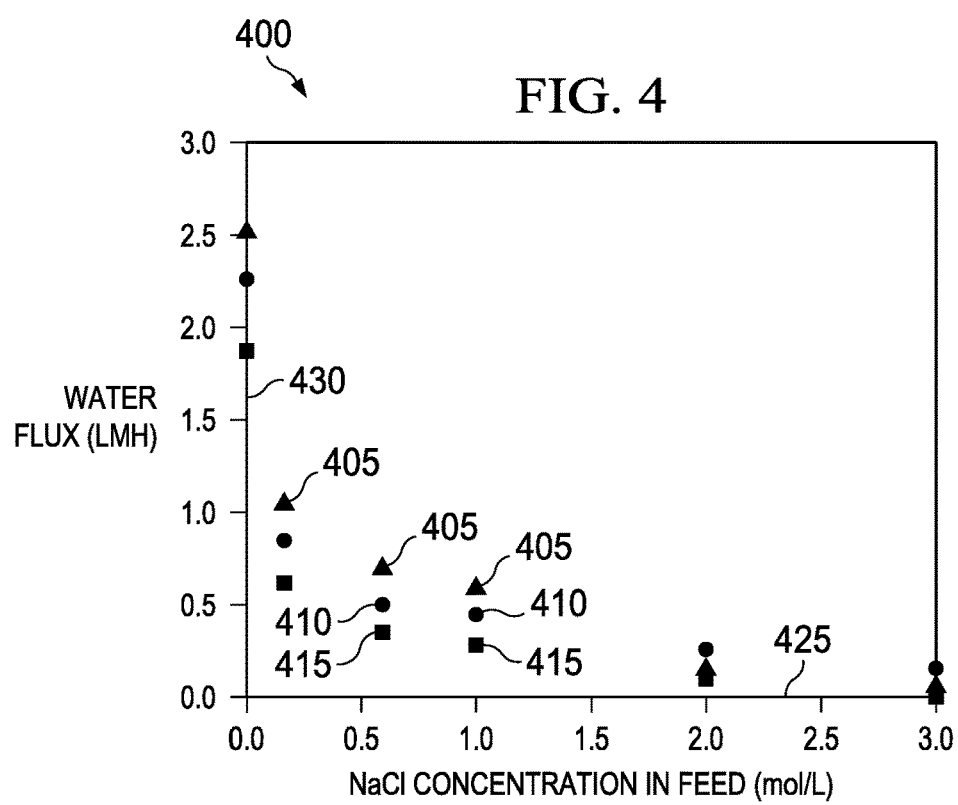

METHOD OF OSMOTIC ENERGY HARVESTING USING RESPONSIVE COMPOUNDS AND MOLECULES

CROSS-REFERENCE TO RELATED APPLICATIONS

This application is the National Stage of International Application No. PCT/IB2017/050292, filed Jan. 19, 2017, which claims the benefit of and priority to Singapore Provisional Patent Application Serial No. 10201600442R filed Jan. 20, 2016, which is incorporated herein by reference in its entirety.

RELATED APPLICATION DATA

This application claims the benefit of Singapore Provisional Patent Application Serial No. 10201600442R filed Jan. 20, 2016.

TECHNICAL FIELD

The present invention relates to a method and system for osmotic energy production and capture using responsive compounds and molecules.

BACKGROUND OF THE INVENTION

According to the International Energy Agency, the current global energy supply is overwhelmingly originated from fossil fuel combustion, and only a small portion of our world-wide energy needs are supplied by renewable resources such as solar, wind, wave, geothermal and hydroelectric power sources. *International Energy Agency, World Energy Outlook, OECD/IEA, Paris,* 2011. Osmotic power systems generating salinity gradient energy are considered to be a promising alternative renewable energy source with an estimated power potential of approximately 2 TWh/year globally. Logan, B. E.; Elimelech, M., *Membrane-based processes for sustainable power generation using water. Nature* 2012, 488 (7411), 313-319; Ramon, G. Z.; Feinberg, B. I; Hoek, E M., *Membrane-based production of salinity-gradient power, Energy & Environmental Science* 2011, 4, (11), 4423-4434.

Osmotic power, or salinity gradient energy, is an energy that can released and harvested by mixing two solutions with different concentrations in a power cycle or system. In 1954, R. E. Pattie first suggested the presence of an untapped osmotic pressure source of power in geographic locations where a freshwater river mixes with sea water. Pattle, R. E., "*Production of electric power by mixing fresh and salt water in the hydroelectric pile,*" *Nature,* 174 (4431), 2 Oct. 1954. In the 1970s, Sidney Loeb outlined several practical methods for exploiting osmotic power using pressure retarded osmosis (PRO) and reverse electrodialysis (RED) systems. U.S. Pat. No. 3,906,250 to Loeb, issued Sep. 16, 1975 (PRO) and U.S. Pat. No. 4,171,409 to Loeb, issued Oct. 16, 1979 (RED).

Currently, pressure retarded osmosis (PRO), reverse electrodialysis (RED), and capacitive mixing (CM) have been investigated as the three major methods used to harvest salinity gradient energy; and, among these three methods, PRO is the most widely investigated salinity gradient energy technology. Lin, S.; Straub, A. P.; Elimelech, M., *Thermodynamic limits of extractable energy by pressure retarded osmosis. Energy & Environmental Science* 2014, 7, (8), 2706. Most of the research into pressure retarded osmosis (PRO) power systems has focused on the use of seawater as a draw solution and fresh river water as a feed solution, which requires the PRO power plant to be built in a geographic location near the interface of a freshwater river and the sea, or near another type of hypersaline water source, such as the Dead Sea or Great Salt Lake.

The problems currently associated with known osmotic power systems include the following: (1) limited geographic locations where there is an abundance of saline or hypersaline solutions and fresh river water used for feed and draw solution sources; (2) limited osmotic pressures that exist near sea level (seawater's osmotic pressure is approximately 27 bar, which is not sufficient to make PRO energetically competent); (3) membrane permeability problems limit the power system's economic feasibility (existing membranes are permeable for the sizes of $Na^+$ and $Cl^-$ in the solute, which limits improvements without sacrificing selectivity); (4) environmental harm to certain animal or plant species resulting from the discharge of the brackish water from existing types of osmotic power systems, which can cause salinity fluctuations to sensitive ecosystems; and (5) net energy reductions resulting from energy required for operation of open systems, including energy consumed during intake, discharge, and pretreatment of feed and draw solutions.

The world's first PRO pilot plant was built by Statkraft, and this pilot power plant used the osmotic gradient between the sea and a nearby freshwater river. Akst, D., *Wall Street Journal,* Aug. 29, 2014 "*A New Kind of Power From Salt Water*;" Moskwa, W., Reuters, Nov. 24, 2009, "*Norway opens world's first osmotic power plant.*" The Statkraft pilot plant is reported to have generated a gross power output of between 2-4 kW. Plans for further development and construction of additional osmotic power plants has been suspended by Statkraft based on the problems experienced with the pilot plant operations.

Enhancing the draw solution's osmotic pressure can be achieved by choosing brines from RO plant or hypersaline lakes (e.g., Dead Sea, Great Salt Lakes), but this solution does not resolve all the problems mentioned above, although such modifications can enhance the power density achieved by prior art systems to a small degree. Helfer, F.; Lemckert, C.; Anissimov, Y. G., *Osmotic power with Pressure Retarded Osmosis: Theory, Performance and Trends—A Review,*" *Journal of Membrane Science* 2014, 453, 337-358. While other scholars have attempted to modify feed and draw compounds used in existing power systems, these modified systems do not resolve all of the above problems, which persist and remain unresolved prior to the conception and development of the present invention. McGinnis, R. L.; McCutcheon, J. R.; Elimelech, M., "*A novel ammonia-carbon dioxide osmotic heat engine for power generation,*" *Journal of Membrane Science* 2007, 305, (1-2), 13-19; 7 Al-Mayahi, A.; Sharif A. *Osmotic Energy.* 2006, US 2006/0225420.

SUMMARY OF THE INVENTION

The present invention is a novel osmotic power system that uses stimuli responsive draw solutions, economically feasible larger permeable membranes, and low grade heat sources to deliver osmotic power more efficiently and economically with less negative environmental impact, greater power output, and more flexibility of being located in more geographically diverse areas of the world than previously thought possible.

The present invention uses a group of novel thermally responsive draw solutions, which can generate osmotic pressures comparable (or even higher) than those of brines from hypersaline lakes. These new types of stimuli responsive draw fluids or combinations of draw fluids include, but are not limited to, ionic liquids and other molecules having LCST (lower critical solubility temperature) or UCST (upper critical solubility temperature). These novel draw solutions, used in conjunction with the present invention, enables energy harvesting systems to be located in many different geographic locations and also eliminates the necessity of carrying out extensive intake pretreatment and discharge operations (which are energy intensive activities).

Due to the much larger molecular size of the novel draw solutions used in the present invention (larger than NaCl), less expensive non-RO type membranes (such as nanofiltration (NF) or even ultrafiltration (UF) membranes) with a much larger permeability can now be utilized in the present PRO system. Accordingly the nresent invention uses new types of larger permeable membranes than previously thought could be used in an osmotic power system, and these larger permeable membranes make the generation of power less expensive.

Further, the present invention can use low grade thermal energy like industrial waste heat, solar heat or geothermal heat for the external stimuli of the novel draw solutions used in the present invention, which means the present system would be supported in many different geographic areas that possesses an abundance of such low grade thermal energy. The use of low grade thermal energy also reduces the overall energy consumption required to operate existing osmotic power systems, and reduces the need to generate high grade thermal energy or power to sustain operations such as fluid intake, discharge, pretreatment, or other energy consumptive activities that compromise the net energy output and cost of operation of the power system.

The present invention can also operate as a closed regenerative system, which would reduce the negative environmental impact experienced by existing open osmotic power systems using natural feed and draw fluid sources. The present invention can also be located in a variety of geographic areas having little or no fresh/brackish (hypersaline) water interfaces. That is, instead of relying on the natural occurrence of a salinity (or concentration) gradient between seawater and river water (or between RO brine and brackish water supplies), the present invention would be supported by the regeneration of the concentration gradient of the draw solutions through the application of an external stimuli, such as heat that can be in the form of industrial waste heat, solar heat or geothermal heat. Essentially, the energy harvesting systems described herein can use low grade thermal energy as an efficient way of using liquids that have LCST or UCST phase behavior.

The present invention discloses and claims a more efficient and economical method and system for osmotic energy production and capture through the use of responsive solutions. The present invention is an energy harvest system enabled by stimuli responsive draw solutions which improve efficiency of energy production and result in greater geographic location flexibility, and more affordable, efficient and economical production and delivery of osmotic power.

BRIEF DESCRIPTION OF THE DRAWINGS

The above, and other objects and advantages of the present invention will be understood upon consideration of the following detailed description taken in conjunction with the accompanying drawings, in which like reference characters refer to like parts throughout, and in which:

FIG. 1 is a schematic diagram of a general osmotic liquid pressure system;

FIGS. 2A and 2B are molecular structures of, respectively, an Upper Critical Solution Temperature (UCST) ionic liquid protonated betaine bis(trifluoromethylsulfonyl)imide ([Hbet][Tf$_2$N]) and a Lower Critical Solution Temperature (LCST) ionic liquid tetrabutylphosphonium 2,4-dimethylbenzensulfonate (P4444 DMBS);

FIG. 3 is a graph showing temperature vs. ionic liquid (water rich and ionic liquid rich phases) concentration by weight;

FIG. 4 is a graph showing water flux at different NaCl feed concentrations for draw solutions at different temperatures;

Figure 5:
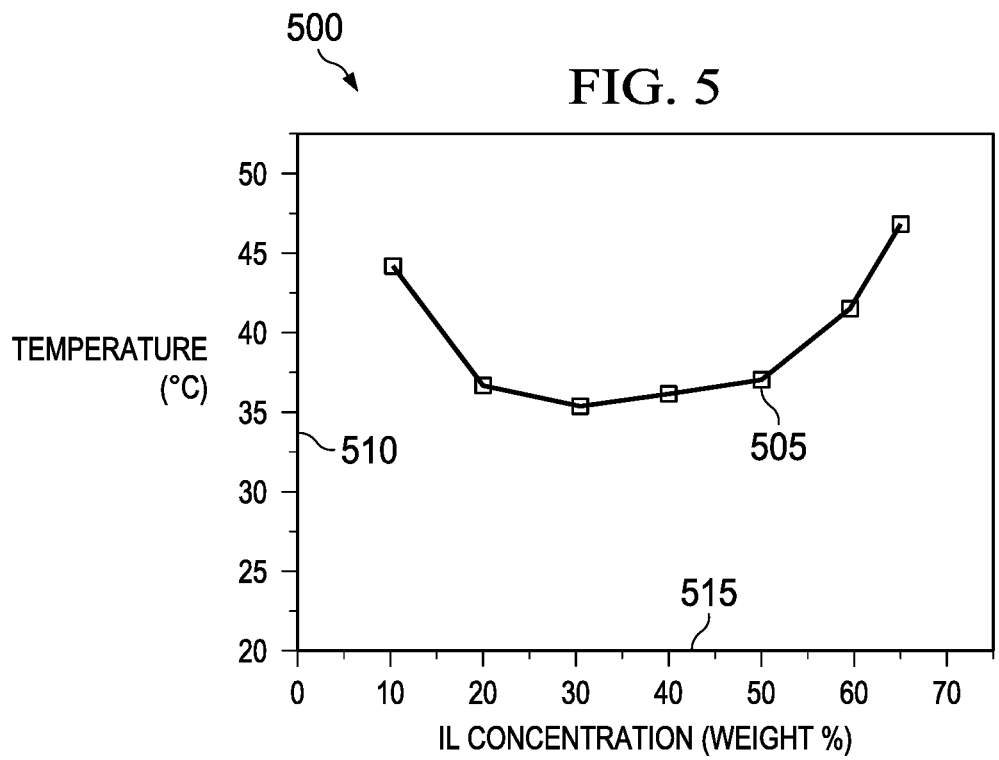
FIG. 5 is a graph showing temperature vs. ionic liquid (P4444 DMBS) concentration by weight.

While the invention is susceptible to various modifications and alternative forms, specific embodiments thereof have been shown by way of example in the drawings and are herein described in detail. For example, the schematic diagrams shown in FIGS. 1, 7-11, and 12A-B do not itemize or describe in manufacturing detail the dimensions, shapes, sizes, inputs or outputs, or exact specification of several identified elements (e.g. osmosis pressure chamber, permeable membrane, heat exchanger, heat source, cold sinks), which are all understood to be within the scope of the invention as described and claimed. Furthermore, size and shapes of piping as well as location, sizes and specifications for pumps, intakes, valves, reservoirs, and separators are not described in manufacturing detail, but such details are understood to be modifiable for each system while still occupying the scope of the invention set forth herein and covered by the claims. It should be understood, however, that the description herein of specific embodiments is not intended to limit the invention to the particular forms disclosed. On the contrary, the intention is meant to cover all modifications, equivalents, and alternatives falling within the spirit and scope of the invention as defined by the appended claims.

DETAILED DESCRIPTION

To describe with principles of the present invention, a diagram of a system for harvesting of salinity gradient energy by PRO is schematically shown in FIG. 1. In FIG. 1, a schematic diagram of a general osmotic liquid pressure chamber 100 is shown with a semi-permeable membrane 120 placed between two solutions, which include a feed solution (pure water, lower concentration) 105 and draw solution (e.g. saline water, higher concentration) 110. The semi-permeable membrane 120 can reject solute, but allows the passage of water feed solution 105 into the draw solution 110.

The concentrated draw solution 110 (draw solution/saline water) has a higher osmotic pressure $\Delta P$ 125, and the other diluted feed solution 105 has a lower osmotic pressure (feed solution/pure water). The symbol J 135 denotes the osmotic water flux direction that occurs when a lower hydraulic pressure is imposed on the draw solution 110 compared to the osmotic pressure difference across the membrane 120. This condition is denoted by the formula $$0 < \Delta P < \Delta \Pi$$

Pressure $\Delta P$ 125 increases on the draw solution 110 under these conditions, and this osmotically originated water flux can be directed into a hydroelectric power cycle from the draw solution pressure chamber where the hydraulic pressure can be converted into mechanical energy in a hydro-turbine to generate electricity.

The membrane's power density is defined as $$W = J \times \Delta P = A(\Delta \Pi - \Delta P) \times \Delta P$$

where A is the membrane's intrinsic water permeability, $\Delta P$ is the hydraulic pressure difference and $\Delta \Pi$ is the osmotic pressure difference. Therefore, it is easy to calculate that the power density maximizes when $\Delta P$ is half of $\Delta \Pi$, then $$W_{max} = \frac{A}{4} \Delta \Pi^2$$

It is worth mentioning that the $\Delta \Pi$ is actually the osmotic pressure difference of the two solutions in the vicinity of the semi-permeable membrane. Due to concentration polarization, this value (osmotic pressure difference) is lower than that between the two bulk solutions.

Using these formula relations, two ways to maximize the power density in a PRO power system include improving the semi-permeable membrane's permeability and osmotic driving force. Limitations in current systems implementation have previously made such improvements impractical and unrealized. For example, most PRO research currently conducted to date has used seawater as draw solution and river water as feed solution, which requires the PRO facility to be located at the intersection of where a freshwater river meets the sea. This limits the geographic locations where power systems can be placed. The world's first PRO pilot plant built by Statkraft used this kind of osmotic gradient between the sea and the river. However, the seawater's osmotic pressure of roughly 27 bar is not high enough to make PRO energetically competent, and the sizes of $Na^-$ and $Cl^-$ in the solute are so small that the room for further membrane water permeability improvement is very limited without sacrificing selectivity.

Modifying a membrane with over-enhanced permeability would result in reduction in selectivity and also cause severe salt back diffusion, which reduces the draw solution's effective osmotic pressure and deteriorates the overall power density of the system. In addition, electrical energy input is needed in the draw solution's pretreatment, intake and discharge, which would also reduce the net energy output of the system Enhancing the draw solution's osmotic pressure by choosing brines from RO plant or hypersaline lakes (e.g., Dead Sea, Great Salt Lakes) would still not eliminate the problems mentioned above, although the power density of such system would be increased slightly over other systems.

As such, prior to the present invention, existing research into modifications of PRO systems have left unrealized and unresolved the long-felt need to increase power density, improve affordability of membranes, and increase osmotic driving force. The present invention solves and maximizes these previously unresolved problems by using stimuli responsive draw solutions, economically feasible larger permeable membranes, and low grade heat sources to deliver osmotic power more efficiently and economically with less negative environmental impact, greater power output, and more flexibility in the location of power plants in geographically diverse areas of the world than previously thought possible for supporting such a power source.

Specifically, the present invention uses a group of novel thermally responsive draw solutions that can generate osmotic pressures comparable (or even higher) than those of brines from hypersaline lakes. These new types of stimuli responsive draw fluids or combinations of draw fluids include, but are not limited to, ionic liquids and other molecules having a LCST (lower critical solution temperature) or an UCST (upper critical solution temperature). These novel draw solutions, used in conjunction with the present invention, enables energy harvesting systems to be located in many different types of geographic locations and also eliminates the necessity of carrying out extensive energy-intensive intake pretreatment and discharge operations (which are energy intensive activities).

Due to the much bigger molecular size of the novel draw solutions used in the present invention (larger than NaCl), non-RO type membranes (such as nanofiltration (NF) or even ultrafiltration (UF) membranes) with a much larger permeability can be used in the present PRO system. Accordingly, the present invention uses new types of larger permeable membranes than previously thought could be used in an osmotic power system, and these larger permeable membranes are more cost affordable to create and use in the system, which increases the cost efficiency of the present invention over the prior art systems.

A suitable thermally responsive draw solution in the present invention should undergo a liquid-liquid phase separation upon exposure to a temperature change. Some draw solutions assume a Lower Critical Solution Temperature (LCST). When the temperature increases above the LCST temperature threshold using an LCST draw solution, the draw solution would have a liquid-liquid phase separation resulting in a draw solute-rich phase and a water-rich phase. Conversely, some draw solutions assume an Upper Critical Solution Temperature (UCST). These UCST draw solutions are homogeneous at temperatures above UCST, but undergo phase separation when the solution temperature drops below UCST temperature threshold.

FIGS. 2A and 2B are molecular structures for, respectively, an Upper Critical Solution Temperature (UCST) ionic liquid protonated betaine bis(trifluoromethylsulfonyl)imide ([Hbet][Tf$_2$N]) 205 and a Lower Critical Solution Temperature (LCST) ionic liquid tetrabutylphosphonium 2,4-dimethylbenzenesulfonate (P4444 DMBS) 215. Alternatively, other thermally responsive molecules, including tetrabutylphosphonium mesitylenesulfonate, tributyloctylphosphonium bromide, tetrabutylphosphonium fumarate, tetrabutylphosphonium maleate, tetrabutylphosphonium trifluoromethanesulfonate, tetrabutylphosphonium p- toluenesulfonate, tetrabutylammonium mesitylenesulfonate, choline bis(trifluoromethylsulfonyl)imide, 1-butyl-3-methylimidazolium tricyanomethanide, 1-butyl-1- methylpyrrolidinium tricyanomethanide, 1-butyl-1-methylmorpholinium tricyanomethanide, poly(trimethylene ether) glycol, diethylene glycol 2-methyl-1-butyl ether, diethylene glycol n-pentyl ether, triethylene glycol n-hexyl ether, triethylene glycol n-heptyl ether and ethylene glycol n-butyl ether can also be used in this invention.

Using these UCST and LCST ionic liquids as the draw solutions in the present invention, the present invention can use low grade thermal energy (such as industrial waste heat, solar heat or geothermal heat) as an external stimuli to initiate the phase transition of the draw solutions. The use of low grade thermal energy means the present system would be supported in any area or location that possesses an abundance of such low grade thermal energy. The use of low grade thermal energy also reduces the overall energy consumption required to operate existing osmotic power systems, and reduces the need to generate high grade thermal energy to sustain operations such as fluid intake, discharge, or pretreatment, or other energy consumptive activities that compromise the net energy output of the power system.

FIG. 3 is a graph 300 showing temperature 320 vs. ionic liquid (water-rich squares 310 and ionic liquid-rich circles 315 phases) concentration by weight 325. In FIG. 3, the phase diagram of UCST-type [Hbet][Tf$_2$N] draw solution is shown. At temperatures above 56° C., the ionic liquid and water can mix to form a homogeneous solution at any concentration. When the temperature is decreased below that threshold, the ionic liquid solution undergoes a liquid-liquid phase separation resulting in a separate ionic liquid-rich phase and a water-rich phase. With decreasing temperature and increasing phase separation, the draw solute concentration decreases in the water-rich phase and the draw solute concentration increases in the draw solute-rich phase. With increasing temperatures, a homogenous solution can be achieved with the draw solute concentration increasing in the water-rich phase and the draw solute concentration decreasing in the draw solute-rich phase.

FIG. 4 is a graph 400 showing water flux 430 at different NaCl feed concentrations 425 (Mol/L) for draw solutions at different temperatures. FIG. 4 shows a comparison of water flux 430 at different feed concentrations for the 3.2 M (88 wt %) ionic liquid draw [Hbet][Tf$_2$N] solution 410 at 60° C. and 3.2 M NaCl solution 405, 415 at 60° C. and 23° C., respectively, draw solutions. 88 wt % ionic liquid draw [Hbet][Tf$_2$N] solution 410 is proven to have a higher osmotic pressure than that of 3 M NaCl solutions 415, 405. For instance, at 23° C., the concentrations of draw solute-rich phase (ionic liquid-rich phase) and water-rich phase are 88 wt % and 13 wt %, respectively, as shown in FIG. 3. The draw solute-rich phase can still generate a water flux, as seen from FIG. 4, from brines with a concentration up to 3M NaCl, which is five times the salinity of seawater, while the water-rich phase assumes an osmotic pressure is much lower than that of seawater. This significant disparity in osmotic pressure triggered by temperature is used in the present PRO invention to achieve the objectives of increasing power density, improving membrane permeability, and increasing osmotic driving force.

Another novel draw solution used in the present invention is the LCST-type P4444 DMBS solution. FIG. 5 is a phase diagram graph 500 showing temperature 510 vs. ionic liquid (P4444 DMBS) concentration by weight 515. Unlike the UCST-type draw solution, P4444 DMBS can mix with water to form a homogeneous aqueous solution at any concentration for temperatures below 35° C., as can be seen in FIG. 5.

Increasing the temperature above 35° C. would result in a wider gap of draw solute concentrations 505 and a separation into the two phases. As shown in FIG. 5, as temperature increases above 35° C., the LCST-type P4444 DMBS draw solution undergoes a liquid-liquid phase separation 505 to form a draw solute-rich phase and a water-rich phase. At 65° C., the concentrations in draw solute-rich phase (ionic liquid-rich) and water-rich phase are 70 wt % and 7 wt %, respectively.

Figure 6:
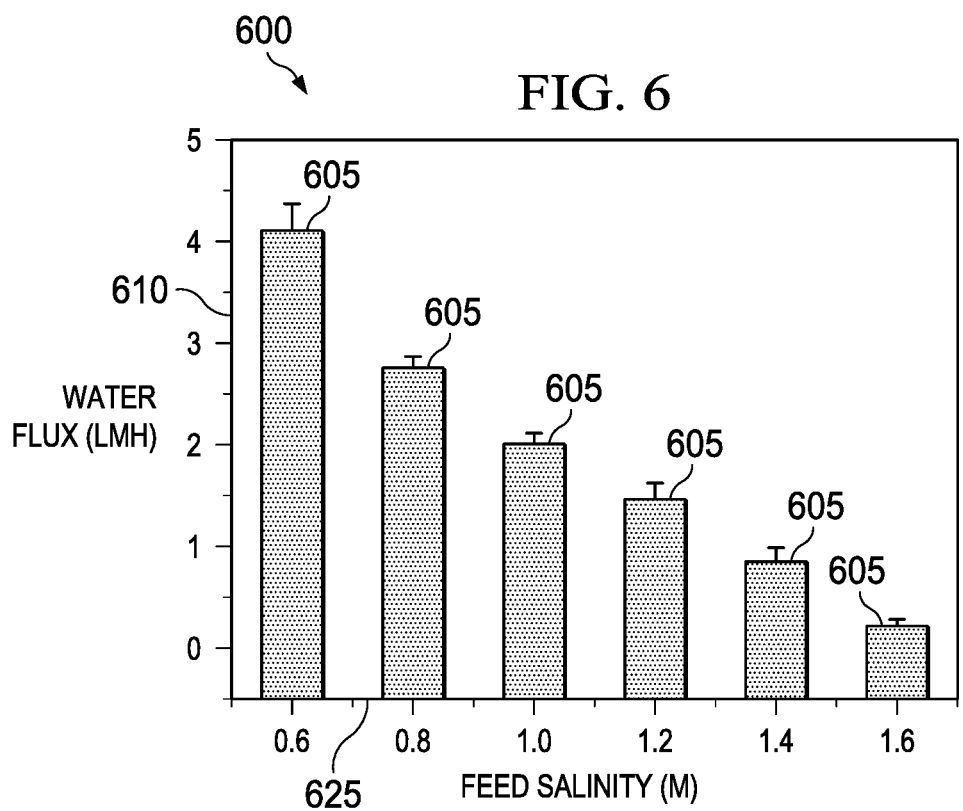
FIG. 6 is a graph showing water flux at different feed salinity concentrations for draw solution P4444 DMBS.

FIG. 6 is a graph 600 showing water flux (LMH) 610 at different feed salinity concentrations (M) 625 for draw solution P4444 DMBS. As demonstrated in FIG. 6, the 70 wt % LCST-type draw solution (P4444 DMBS) can also generate a water flux 605 from 1.6 M solution at 14° C., which is almost 3 times the salinity of seawater. The water-rich phase has an osmotic pressure of less than 6 bar, much lower than that of seawater.

Figure 7:
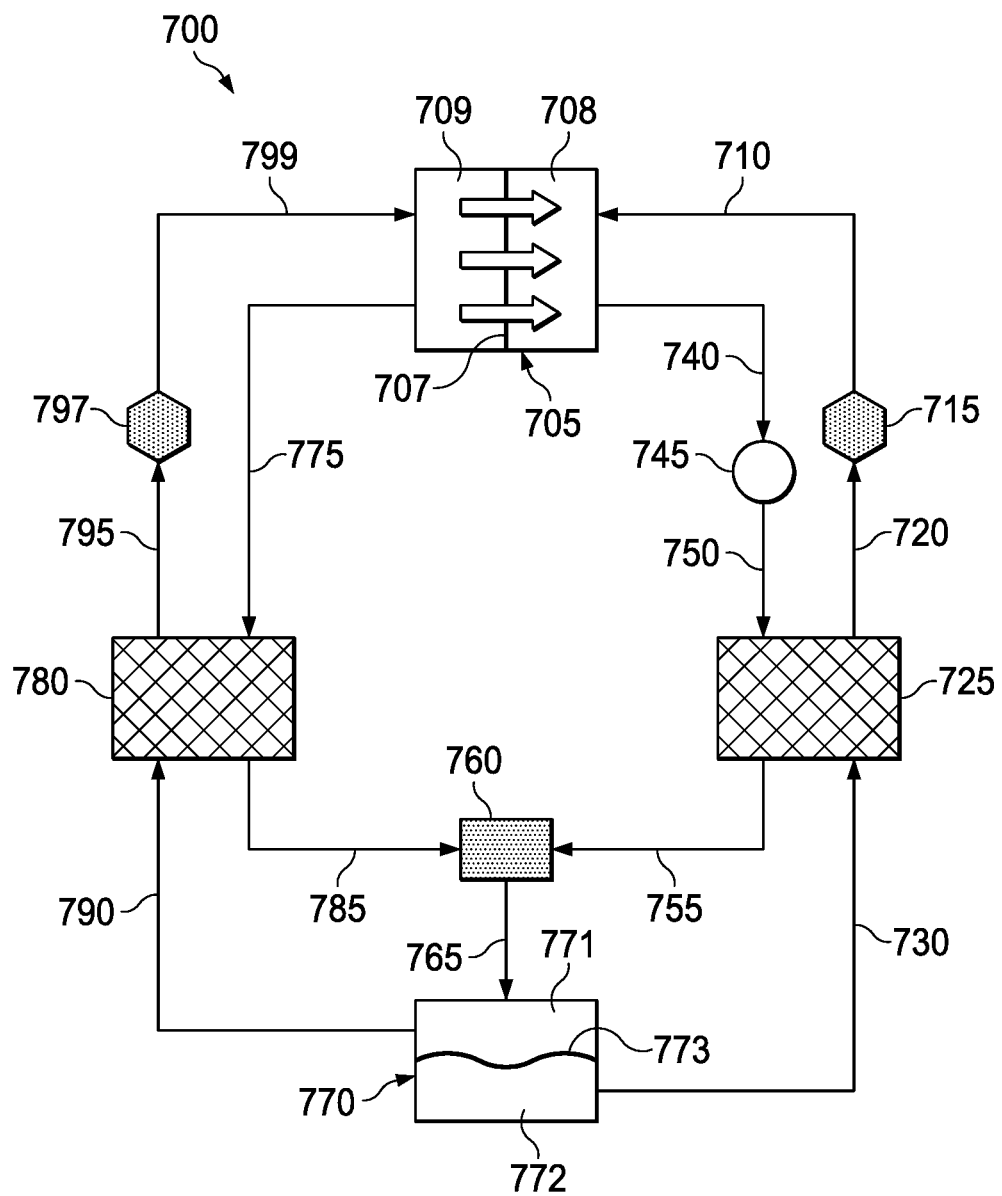
FIG. 7 is a schematic diagram of one illustrative embodiment of an osmotic power system employing an Upper Critical Solution Temperature (UCST) ionic liquid draw solution in the present invention.

The PRO technology enabled in the present invention does not require the use of natural osmotic pressure gradient between seawater (or brines from RO plant, Dead Sea, etc.) and fresh river water, but utilizes the osmotic pressure gradient generated from synthesized draw solutions phase separation. FIG. 7 is a schematic diagram of one illustrative embodiment of an osmotic power system 700 employing an Upper Critical Solution Temperature (UCST) ionic liquid draw solution in the present invention. The present invention using a UCST-type draw solution is shown in FIG. 7, which has an osmotic pressure chamber 705 having a pressure retarded osmosis (PRO) membrane 707, a draw solution chamber 708 filled with a UCST draw solution and a feed solution chamber 709 filled with feed solution. With the increase in osmotic pressure using the above described draw solutions under the appropriate predetermined temperature and pressure settings, the output draw line 740 directs pressurized draw solution from the draw solution chamber 708 to turbine 745 where electrical power is generated from the conversion of mechanical energy. The draw solution is then released from the turbine 745 to the first heat exchanger 725 along output turbine draw line 750, and then directed to the cold sink 760 from output heat exchanger draw line 755. The first heat exchanger 725 allows the residual heat from the used draw solution to pre-heat the circulated draw solution before being re-used in the system.

The feed solution is directed from the feed solution chamber 709 in the osmotic pressure chamber 705 along output feed line 775 to the second heat exchanger 780. The second heat exchanger 780 allows the residual heat from the used feed solution to pre-heat the circulated feed solution before being re-used in the system. The feed solution is then directed to the cold sink 760 from output heat exchanger feed line 785. The cold sink 760 cools the draw and feed solutions to an appropriate predetermined level before transferring the draw and feed solutions to the separator 770 along line 765. At the separator 770, the combined feed and draw solutions are separated into water-rich feed solution in feed separator chamber 771 and ionic liquid-rich draw solution in draw separator chamber 772 separated along a separator line 773.

The ionic liquid-rich draw solution (or draw solution) is directed along line 730 to the first heat exchanger 725 and then along line 720 to the first heat source 715. Likewise, the water-rich feed solution is directed along line 790 to the second heat exchanger 780 and then along line 795 to the second heat source 797. Heat, including low grade energy (or heat generated from the sources set forth herein) is applied to the draw solution in the first heat source 715. From the first heat source 715, the heated draw solution is directed to the draw solution chamber 708 in the osmotic pressure chamber 705. From the second heat source 797, the heated feed solution is directed to the feed solution chamber 709 in the osmotic pressure chamber 705 along line 799.

In this FIG. 7 embodiment, only UCST-type draw solute is needed. At low temperatures, i.e., room temperature or 10° C., the draw solution undergoes a phase separation resulting in a draw solute-rich phase and a water-rich phase. The draw solute-rich phase is the draw solution while water-rich phase is the feed solution in the PRO process after elevating the temperature. The purpose of operating at a high temperature in PRO for UCST-type draw solution is to fully fulfill the draw solute-rich phase's drawing ability, and also prevent any phase separation from concentration change in PRO pressure chamber 705. The draw solute-rich phase, after pushing turbine 745 to generate electricity, is remixed with water-rich phase before cooling is applied to undergo phase separation. In FIG. 7, the PRO membrane unit can be replaced by an RED or CM unit to achieve the same purpose.

Because this embodiment is a closed system, there would be a reduction in the amount of additional electrical energy needed to perform pretreatment, intake and discharge operations, which should increase the net power output efficiency of this system compared to prior art systems. The present invention, when operated as a closed regenerative system, would also reduce the negative environmental impact caused by existing open osmotic power systems using natural feed and draw fluid sources and discharges. The present invention can also be located in a variety of geographic areas having little or no fresh/brackish (hypersaline) water interfaces. That is, instead of relying exclusively on the salinity (or concentration) gradient (e.g., between seawater and river water, or between RO brine and brackish water supplies) as prior research facilities have focused upon, the present invention would be supported by the regeneration of the concentration gradient based on the draw solutions and the application of external stimuli, such as heat in the form of industrial waste heat, solar heat or geothermal heat. Essentially, the energy harvesting systems described herein allows for the harvesting of thermal energy through an efficient way of using liquids which have LCST or UCST phase behavior.

Figure 8:
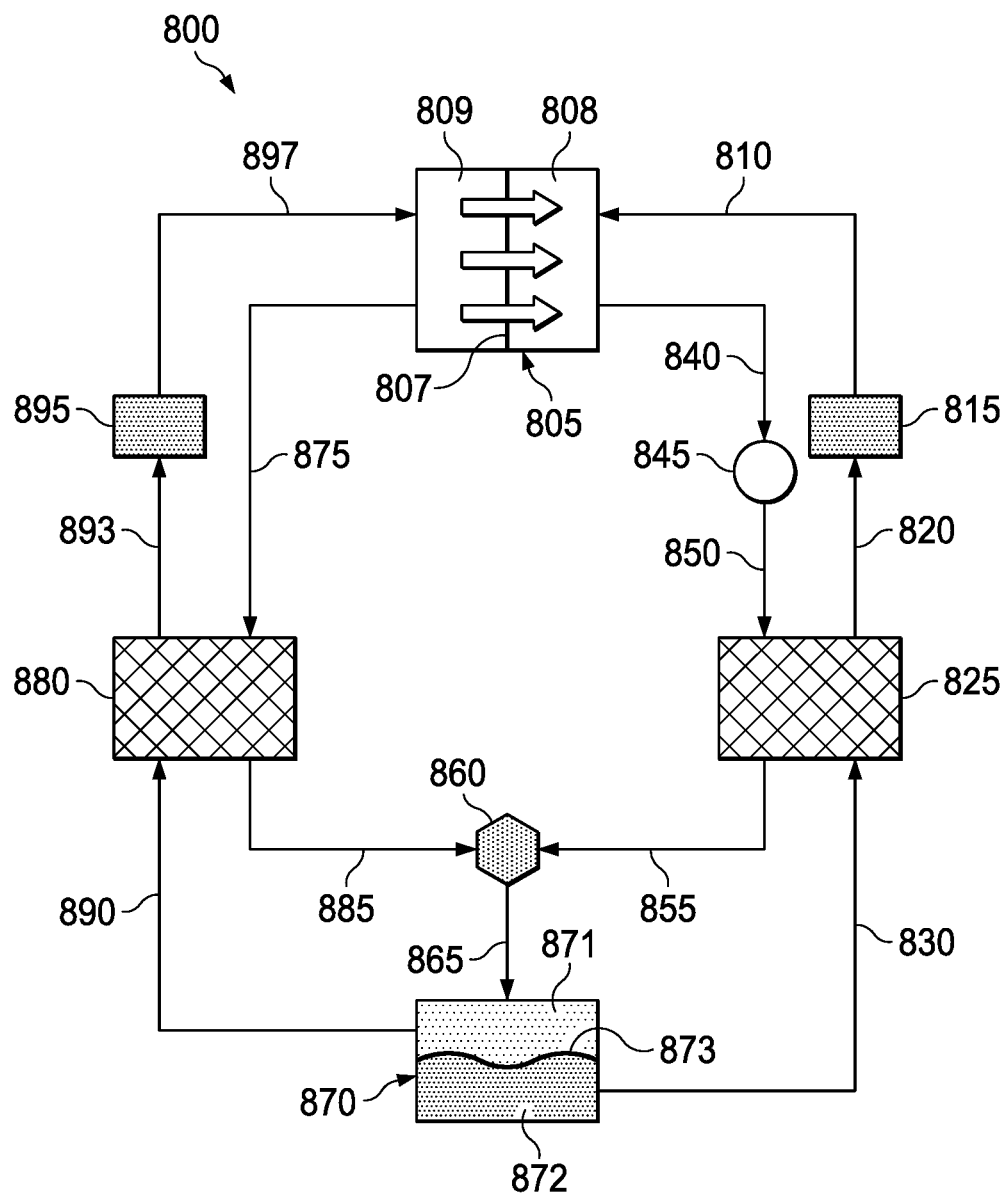
FIG. 8 is a schematic diagram of one illustrative embodiment of an osmotic power system employing a Lower Critical Solution Temperature (LCST) ionic liquid draw solution in the present invention.

FIG. 8 is a schematic diagram of an alternative embodiment of an osmotic power system 800 employing a Lower Critical Solution Temperature (LCST) ionic liquid draw solution. The alternative embodiment of the present invention using a LCST-type draw solution is shown in FIG. 8, which has an osmotic pressure chamber 805 having a pressure retarded osmosis (PRO) membrane 807, a draw solution chamber 808 filled with draw solution and a feed solution chamber 809 filled with feed solution. With the increase in osmotic pressure using the above described draw solutions under the appropriate predetermined temperature and pressure settings, PRO output draw line 840 directs the pressurized draw solution from the draw solution chamber 808 to turbine 845 where electrical power is generated from the conversion of mechanical energy. The draw solution is then released from the turbine 845 to the first heat exchanger 825 along output turbine draw line 850, and then directed to the heat source 860 from output heat exchanger draw line 855. The first heat exchanger 825 allows the residual cooling from the used draw solution to pre-cool the circulated draw solution before being re-used in the system.

The feed solution is directed from the feed solution chamber 809 in the osmotic pressure chamber 805 along output feed line 875 to the second heat exchanger 880. The second heat exchanger 880 allows the residual cooling from the used feed solution to pre-cool the circulated feed solution before being re-used in the system. The feed solution is then directed to the heat source 860 from output heat exchanger feed line 885. The heat source 860 heats the combination of the draw and feed solutions to an appropriate predetermined level before transferring the draw and feed solutions to the separator 870 along line 865. At the separator 870, the combined feed and draw solutions are separated into water-rich feed solution in feed separator chamber 871 and ionic liquid-rich draw solution in draw separator chamber 872 along a separator line 873.

The ionic liquid-rich draw solution (or draw solution) from chamber 872 is directed along line 830 to the first heat exchanger 825 and then along line 820 to the first cold sink 815. Likewise, the water-rich feed solution from chamber 871 is directed along line 893 to the second heat exchanger 880 and then along line 895 to the second cold sink 895. Cooling, including cooling achieved by tapping into deep water thermal properties, is applied to the draw solution in the first cold sink 815 or the feed solution in the second cold sink 895. From the first cold sink 815, the cooled draw solution is directed to the draw solution chamber 808 in the PRO osmotic pressure chamber 805 along line 810. From the second cold sink 895, the cooled feed solution is directed to the feed solution chamber 809 in the PRO osmotic pressure chamber 805 along line 897.

Using a LCST-type draw solution in the FIG. 8, system 800 can achieve the same goals and objectives achieved by using an UCST-type draw solution, although the heating and cooling operations will need to be reversed. As demonstrated in FIG. 8, draw solution undergoes phase separation at high temperatures (i.e., 60° C.). The PRO is operated between the two phases at low temperatures (i.e. room temperature), to fully exert draw solute-rich phase's drawing ability and avoid any phase separation in PRO unit 805. The cold sink can use many different cooling sources, such as cold deep seawater, while the heat source may use low grade industrial waste heat or solar sources.

The electricity consumption in the PRO systems shown in FIGS. 7 and 8 theoretically only comes from the pumping and liquid circulation. Therefore, PRO enabled by these thermally responsive draw solutions can be considered a heat engine that converts thermal energy into electricity. In addition, in these designs, no seawater intake and discharge is needed and the electrical energy consumption should be much lower, and electricity generation should be higher than conventional PRO plants using seawater and river water concentration gradients. Furthermore, no draw solute loss or salt-draw solute contaminations exist in these designs, and less expensive membranes with larger permeability can be used in the present invention due to draw solute's relatively high molecular weights. Compared with $CO_2$-$NH_3$ PRO system that can also be utilized as heat engine, the liquid-liquid phase separation in the present invention has a much lower enthalpy (<5 J/g) than that in the thermolytic process of ammonium salts (>120 J/g). In addition, the phase separation of existing CO2-NH$_3$ systems incurs severe water evaporation, which increases required thermal energy input. Furthermore, compared with gas-liquid phase separation, the liquid-liquid phase separation approach in the present invention should face less practical problems in separation, including clogging and contamination.

Figure 9:
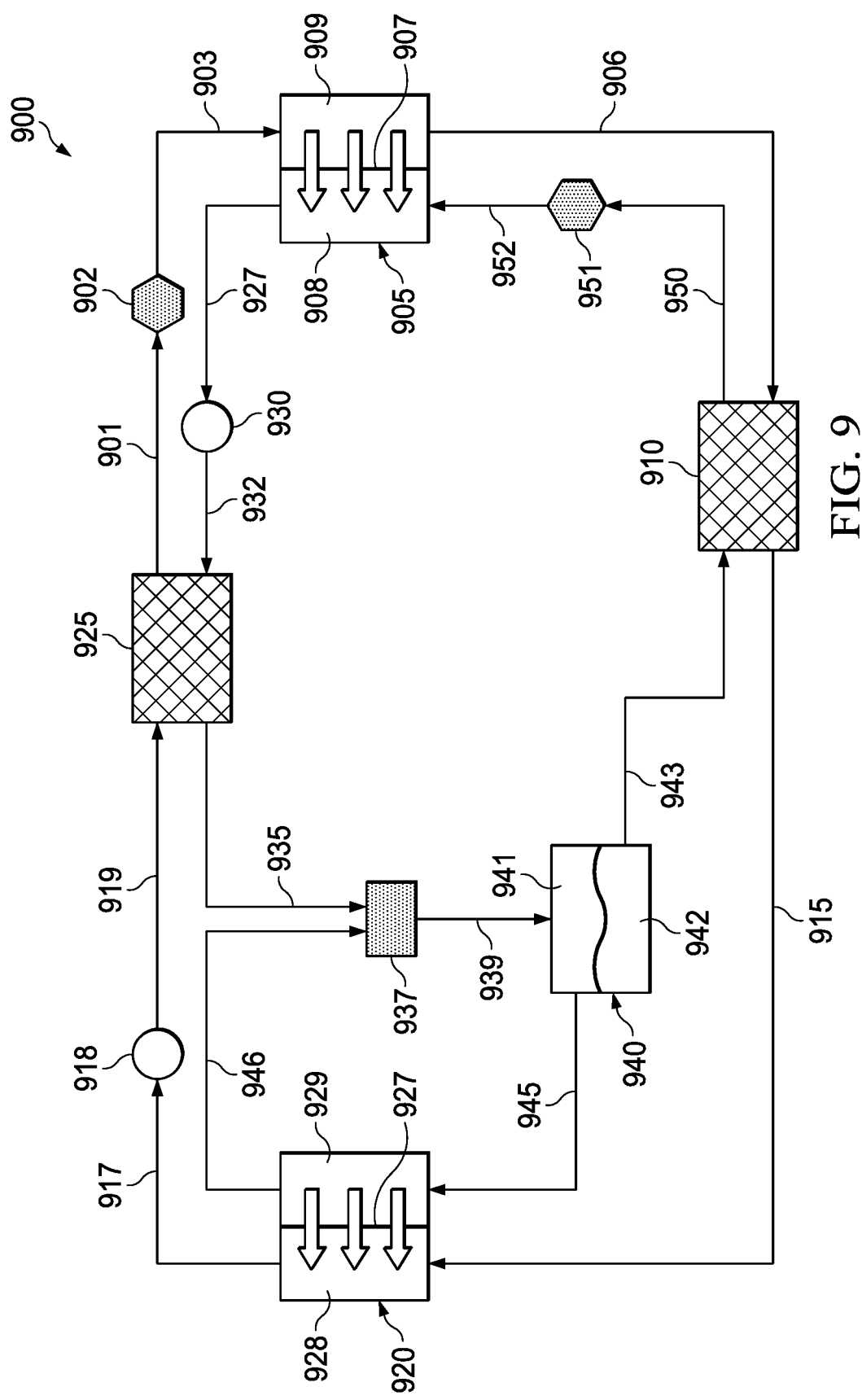
FIG. 9 is a schematic diagram of one illustrative embodiment of an osmotic power system employing an Upper Critical Solution Temperature (UCST) ionic liquid draw solution and seawater draw solution in the present invention.

FIG. 9 is a schematic diagram of one illustrative embodiment of an osmotic power system 900 employing an Upper Critical Solution Temperature (UCST) ionic liquid draw solution and seawater draw solution. In FIG. 9, an example of the PRO system 900 using a seawater and UCST-type draw solution is shown having a first osmotic pressure chamber 905 with a pressure retarded osmosis (PRO) membrane 907, a draw solution chamber 908 filled with draw solution and a feed solution chamber 909 filled with feed solution.

With the increase in osmotic pressure using the above described draw solutions under the appropriate predetermined temperature and pressure settings, PRO output draw line 927 directs the pressurized draw solution from the draw solution chamber 908 to turbine 930 where electrical power is generated from the conversion of mechanical energy. The draw solution is then released from the turbine 930 to the first heat exchanger 925 along output turbine draw line 932, and then directed to the cold sink 937 along output heat exchanger draw line 935. The first heat exchanger 925 allows the residual heat from the used draw solution to pre-heat the circulated draw solution before being re-used in the system.

The feed solution is directed from the feed solution chamber 909 in the first osmotic pressure chamber 905 along output feed line 906 to the second heat exchanger 910. The second heat exchanger 910 allows the residual heat from the used feed solution to pre-heat the circulated feed solution before being re-used in the system. The feed solution is then directed to a second osmotic pressure chamber 920 along input draw line 915. The second osmotic pressure chamber 920 has a pressure retarded osmosis (PRO) membrane 927, a draw solution chamber 928 fed by the input draw line 915 to be filled with draw solution and a feed solution chamber 929 filled with feed solution.

With the increase in osmotic pressure using the above described draw solutions under the appropriate predetermined temperature and pressure settings, PRO output draw line 917 directs the pressurized draw solution from the draw solution chamber 928 of the second osmotic pressure chamber 920 to turbine 918 where electrical power is generated from the conversion of mechanical energy. The draw solution is then released from the turbine 918 to the first heat exchanger 925 along output turbine draw line 919, and then directed to the first heat source 902 along output heat exchanger draw line 901. The first heat exchanger 925 allows the residual heat from the used draw solution to pre-heat the circulated feed solution before being re-used in the system. Upon being re-heated in heat source 902, the feed solution is directed to the feed chamber 909 of the first osmotic pressure chamber 905 via the input feed line 903.

The feed solution used in the second osmotic pressure chamber 920 is transferred from the feed solution chamber 929 along output feed line 946 to the cold sink 937 where draw and feed solutions are combined together and cooled to an appropriate predetermined level before transferring the draw and feed solutions to the separator 940 along line 939. At the separator 940, the combined feed and draw solutions are separated into water-rich diluted feed solution in feed separator chamber 941 and ionic liquid-rich draw solution in draw separator chamber 942 along a separator line.

The ionic liquid-rich draw solution (or draw solution) from chamber 942 is directed along line 943 to the second heat exchanger 910 and then along line 950 to the second heat source 951. Upon re-heating in the second heat source 951, the draw solution is input via line 952 into the draw solution chamber 908 of the first osmotic pressure chamber 905. The water-rich feed solution in the feed separator chamber 941 of separator 940 is directed along line 945 to the feed chamber 929 in the second osmotic chamber 920.

Figure 10:
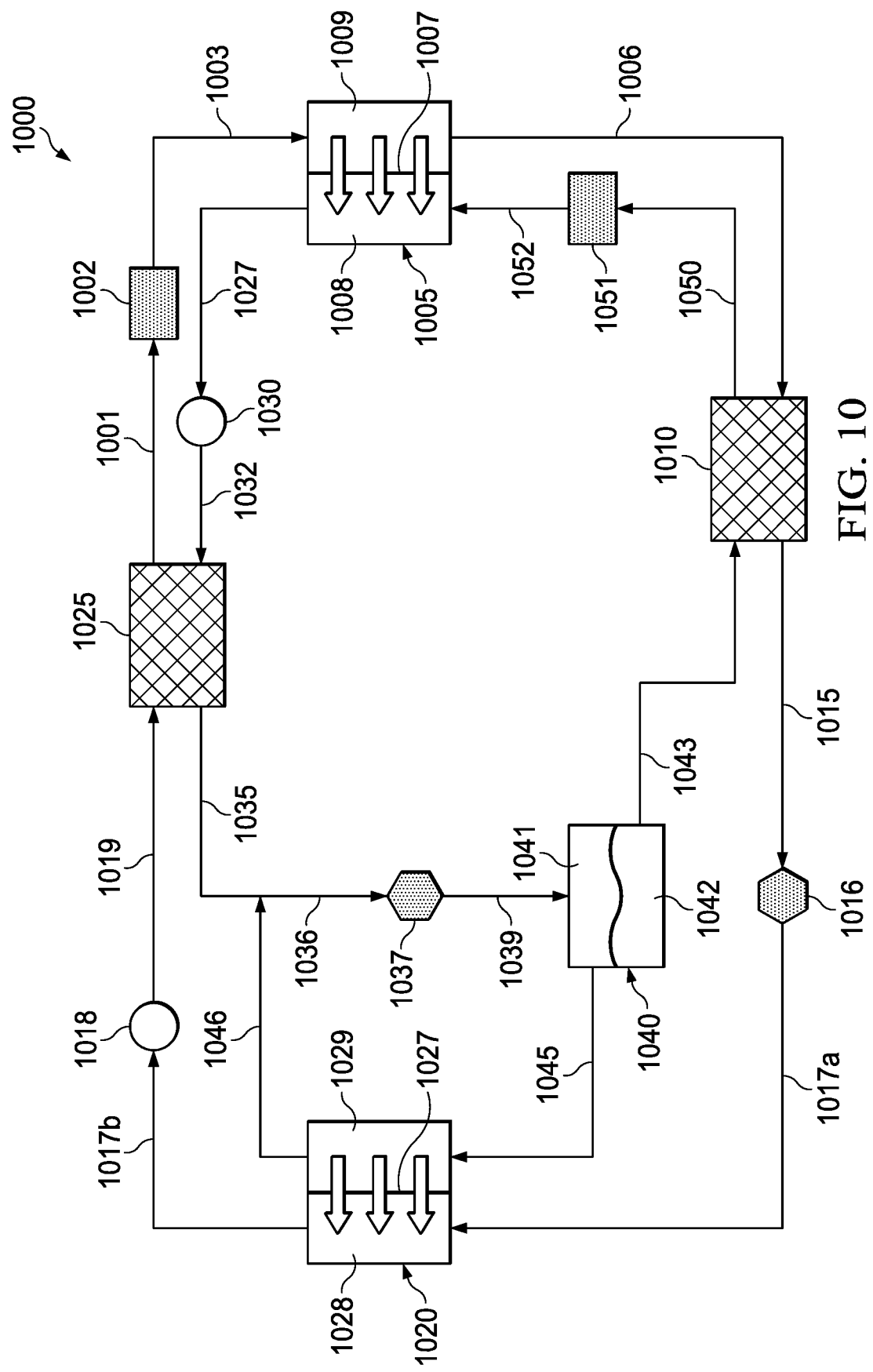
FIG. 10 is a schematic diagram of one illustrative embodiment of an osmotic power system employing a Lower Critical Solution Temperature (LCST) ionic liquid draw solution and seawater draw solution in the present invention.

FIG. 10 is a schematic diagram of one illustrative embodiment of an osmotic power system employing a Lower Critical Solution Temperature (LCST) ionic liquid draw solution and seawater draw solution in the present invention. In FIG. 10, the PRO system 1000 using seawater and LCST-type draw solution has a first osmotic pressure chamber 1005 with a pressure retarded osmosis (PRO) membrane 1007, a draw solution chamber 1008 filled with draw solution and a feed solution chamber 1009 filled with feed solution.

With the increase in osmotic pressure using the above described draw solutions under the appropriate predetermined temperature and pressure settings, the first osmotic pressure chamber 1005 uses output draw line 1027 to direct the pressurized draw solution from the draw solution chamber 1008 to first turbine 1030 where electrical power is generated from the conversion of mechanical energy. The draw solution is then released from the first turbine 1030 to the first heat exchanger 1025 along output turbine draw line 1032, and then directed to the heat source 1037 along output heat exchanger draw line 1035 and line 1036. The first heat exchanger 1025 allows the residual cooling from the used draw solution to pre-cool the circulated feed solution before being re-used in the system.

The feed solution in PRO chamber 1005 is directed from the feed solution chamber 1009 in the first osmotic pressure chamber 1005 along output feed line 1006 to the second heat exchanger 1010. The second heat exchanger 1010 allows the residual cooling from the used feed solution to pre-cool the circulated draw solution before being re-used in the system. The feed solution is then directed to a second heat source 1016 via line 1015 and then transferred onto the second osmotic pressure chamber 1020 along input draw line 1017a. The second osmotic pressure chamber 1020 has a pressure retarded osmosis (PRO) membrane 1027, a draw solution chamber 1028 feed by the input draw line 1017a to be filled with draw solution and a fed solution chamber 1029 filled with feed solution.

With the increase in osmotic pressure in PRO chamber 1020 using the above described draw solutions under the appropriate predetermined temperature and pressure settings, the second osmotic pressure chamber 1020 uses output draw line 1017b to direct the pressurized draw solution from the draw solution chamber 1028 on the second osmotic pressure chamber 1020 to second turbine 1018 where electrical power is generated from the conversion of mechanical energy. The draw solution is then released from the second turbine 1018 to the first heat exchanger 1025 along output turbine draw line 1019, and then directed to the first cold sink 1002 along output heat exchanger draw line 1001. The first heat exchanger 1025 allows the residual cooling from the used draw solution to pre-cool the circulated feed solution before being re-used in the system. Upon being cooled in cold sink 1002, the feed solution is directed to the feed chamber 1009 of osmotic pressure chamber 1005 via the input feed line 1003.

The feed solution used in the second osmotic pressure chamber 1020 is transferred from the feed solution chamber 1029 along output feed line 1046 to be combined with the heat exchanger output line 1035 so the draw and feed solutions are combined together and input along line 1036 into the heat source 1037 to be heated to an appropriate predetermined level before transferring the combined draw and feed solutions to the separator 1040 along line 1039. At the separator 1040, the combined feed and draw solutions are separated into water-rich diluted feed solution in feed separator chamber 1041 and ionic liquid-rich draw solution in draw separator chamber 1042 along a separator line.

The ionic liquid-rich draw solution (or draw solution) is directed along line 1043 to the second heat exchanger 1010 and then along line 1050 to the second cold sink 1051. Upon cooling in the second cold sink 1051, the draw solution is input via line 1052 into the draw solution chamber 1008 in the first osmotic pressure chamber 1005. The water-rich feed solution in the separator 1040 is directed along line 1045 to the feed chamber 1029 in the second osmotic chamber 1020.

The LCST and UCST-type draw solutions used in systems 900 and 1000 can also fulfill their missions in the PRO system with the help of an intermediate solution (for example seawater) that has an osmotic pressure between those of the two phases after phase separation. Thus, there are two PRO processes in the closed-loop configuration. One is between the intermediate solution and water-rich phase, while the other one is between draw solute-rich phase and intermediate solution. The intermediate solution is not necessarily limited to seawater as shown in FIGS. 9 and 10, but can be any aqueous solution with proper osmotic pressure differential that can maximize the energy output.

Figure 11:
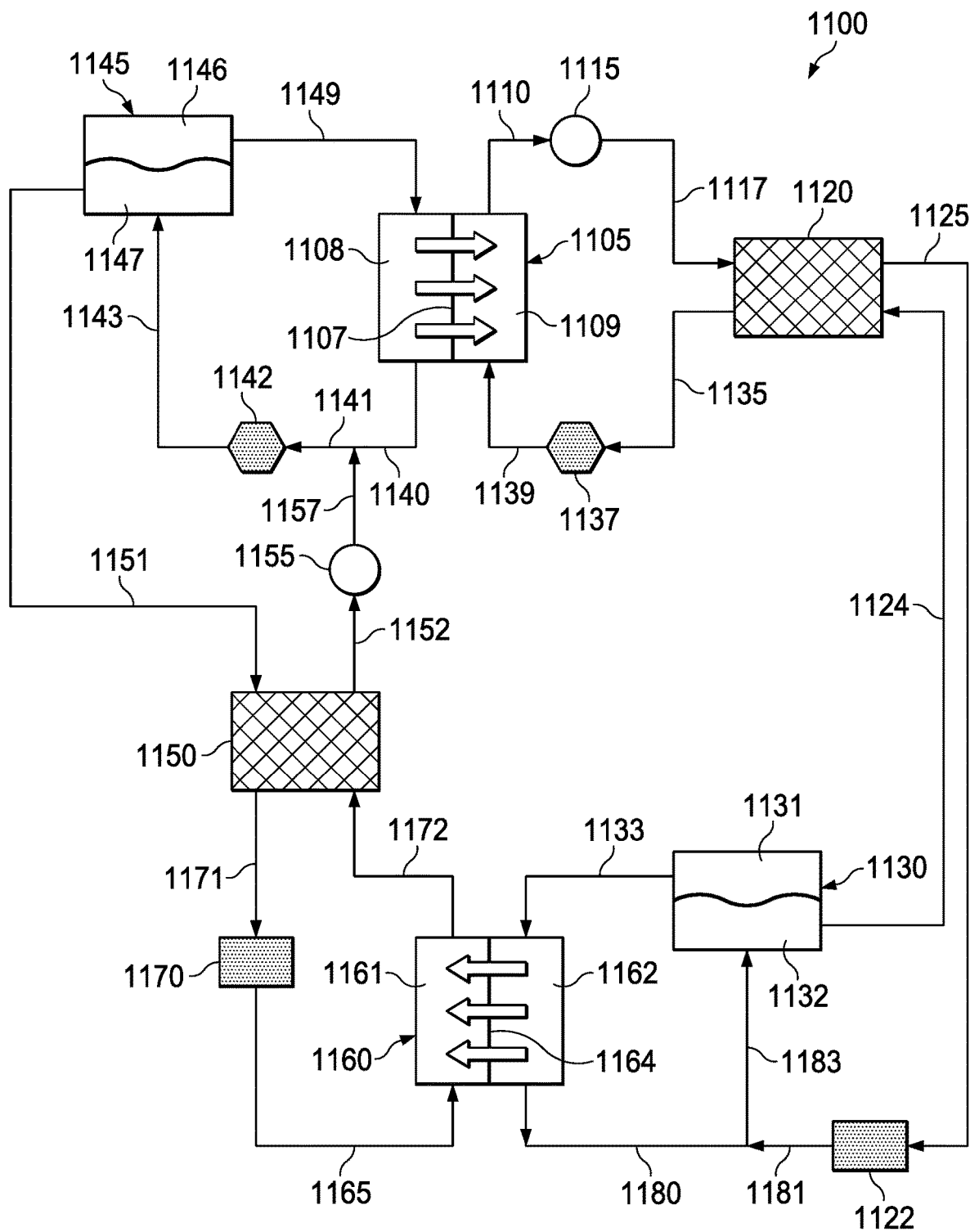
FIG. 11 is a schematic diagram of one illustrative embodiment of an osmotic power system employing an Upper Critical Solution Temperature (UCST) ionic liquid draw solution and a Lower Critical Solution Temperature (LCST) ionic liquid draw solution in the present invention; and, FIGS. 12A and 12B are schematic diagrams of two illustrative embodiments of an osmotic power system employing an Upper Critical Solution Temperature (UCST) ionic liquid draw solution and a Lower Critical Solution Temperature (LCST) ionic liquid draw solution in the present invention.

FIG. 11 is a schematic diagram of one illustrative embodiment of an osmotic power system 1100 employing an Upper Critical Solution Temperature (UCST) ionic liquid draw solution and a Lower Critical Solution Temperature (LCST) ionic liquid draw solution in the present invention. In FIG. 11, the PRO system 1100 uses both LCST-type and UCST-type draw solutions and has a first osmotic pressure chamber 1105 with a pressure retarded osmosis (PRO) membrane 1107, a draw solution chamber 1109 filled with draw solution and a feed solution chamber 1108 filled with feed solution. With the increase in osmotic pressure using the above described draw solutions under the appropriate predetermined temperature and pressure settings, the first osmotic pressure chamber 1105 uses output draw line 1110 to direct the pressurized draw solution from the draw solution chamber 1109 to first turbine 1115 where electrical power is generated from the conversion of mechanical energy. The draw solution is then released from the first turbine 1115 to the first heat exchanger 1120 along output turbine draw line 1117, and then directed to the first cold sink 1122 along output heat exchanger draw line 1125. The first heat exchanger 1025 allows the residual heat from the used draw solution to pre-heat the circulated draw solution before being re-used in the system. The feed solution used in the feed solution chamber 1108 of the first osmotic pressure chamber 1105 is directed along output feed line 1140 to a second heat source 1142.

A second osmotic pressure chamber 1160 has a pressure retarded osmosis (PRO) membrane 1164, a draw solution chamber 1161 filled with draw solution and a feed solution chamber 1162 filled with feed solution. With the increase in osmotic pressure using the above described draw solutions under the appropriate predetermined temperature and pressure settings, the second osmotic pressure chamber 1160 uses output draw line 1172 to direct the pressurized draw solution from the draw solution chamber 1161 on the second osmotic pressure chamber 1160 to a second heat exchanger 1150, and then transfer the draw solution to a second turbine 1155 where electrical power is generated from the conversion of mechanical energy.

The draw solution is then released from the second turbine 1155 along line 1157 to be combined with the feed solution from feed chamber 1108 on the output feed line 1140 and 1141, and then directed to the second heat source 1142 along line 1141. The draw and feed solutions are combined together on line 1141 and input into the second heat source 1142 to be heated to an appropriate predetermined level before transferring the combined draw and feed solutions to the first separator 1145 along line 1143. At the first separator 1145, the combined feed and draw solutions are separated into water-rich diluted feed solution in feed separator chamber 1146 and ionic liquid-rich draw solution in draw separator chamber 1147 along a separator line. The feed solution used in the first osmotic pressure chamber 1105 is transferred to that chamber 1105 from the feed solution chamber 1146 of first separator 1145 along output feed line 1149. The ionic liquid-rich draw solution (or draw solution) formed in chamber 1147 of the first separator 1145 is directed along line 1151 to the second heat exchanger 1150 and then along line 1171 to the second cold sink 1170. Upon cooling in the second cold sink 1170, the draw solution is input via line 1165 into the draw solution chamber 1161 of the second osmotic pressure chamber 1160.

The first cold sink 1122 transfers its feed solution via lines 1181 and 1183 to the second separator 1130. The feed solution used in the feed pressure chamber 1162 of the second osmotic pressure chamber 1160 is transferred to the second separator 1130 via lines 1180 and 1183. On line 1183, the feed solution from the second cold sink 1122 and the second feed pressure chamber 1162 are combined prior to being transferred to the second separator 1130. In the second separator 1130, the combined feed and draw solutions are separated into water-rich diluted feed solution in feed separator chamber 1131 and ionic liquid-rich draw solution in draw separator chamber 1132 along a separator line. The feed solution used in the second osmotic pressure chamber 1160 is transferred to the feed pressure chamber 1162 from the feed solution chamber 1131 of second separator 1130 along output feed line 1133. The ionic liquid-rich draw solution (or draw solution) formed in chamber 1132 of the second separator 1130 is directed along line 1124 to the first heat exchanger 1120 and then along line 1135 to a first heat source 1137. Upon heating at the first heat source 1137, the draw solution is input into the draw solution chamber 1109 of osmotic pressure chamber 1105 via line 1139.

In system 1100 of FIG. 11, there is no need for additional intermediate solutions, and the PRO processes operate between concentrated phase in LCST-type draw solution and diluted phase in UCST-type draw solution, as well as between diluted phase in LCST-type draw solution and concentrated phase in UCST-type draw solution. One of the merits of this design is that the temperature of each PRO process is conducive to achieving highest osmotic pressure gradient. For example, the PRO between concentrated phase from LCST-type draw solution and diluted phase from UCST-type draw solution is at low temperature (i.e., room temperature or 10 D), which helps to increase osmotic pressure for LCST-type draw solution and reduce the osmotic pressure for UCST-type draw solution.

Figure 12A:
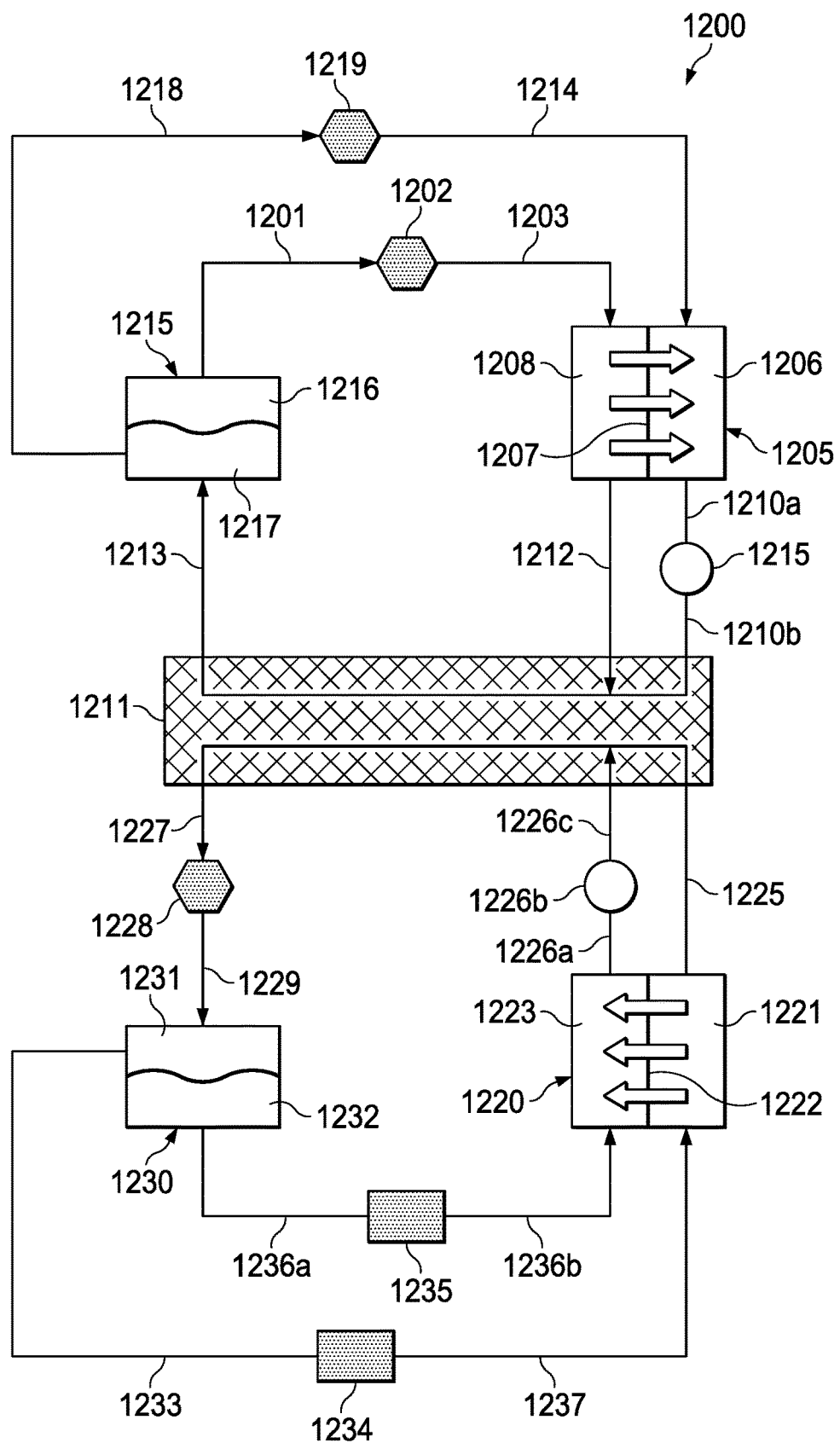
Figure 12B:
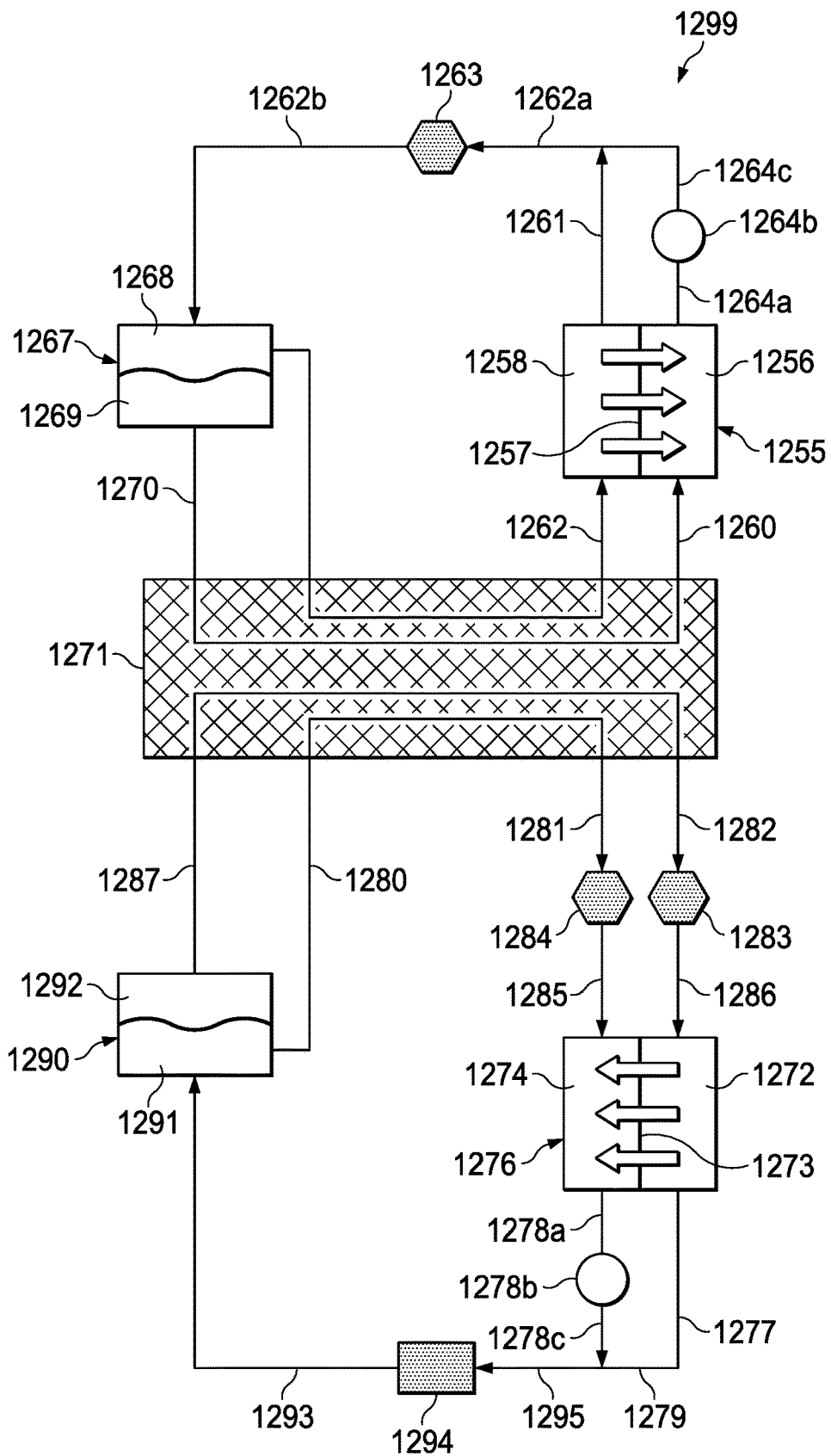

FIGS. 12A and 12B show two additional alternative embodiments that combine both LCST-type and UCST-type draw solutions. Namely, in FIGS. 12A and 12B, schematic diagrams of two illustrative embodiments of an osmotic power systems are shown that employ an Upper Critical Solution Temperature (UCST) ionic liquid draw solution and a Lower Critical Solution Temperature (LCST) ionic liquid draw solution.

In FIG. 12A, the system 1200 uses both LCST-type and UCST-type draw solutions and has a first osmotic pressure chamber 1205 with a pressure retarded osmosis (PRO) membrane 1207, a draw solution chamber 1206 filled with draw solution and a feed solution chamber 1208 filled with feed solution. With the increase in osmotic pressure using the above described draw solutions under the appropriate predetermined temperature and pressure settings, the first osmotic pressure chamber 1206 uses output draw line 1210a to direct the pressurized draw solution from the draw solution chamber 1206 to first turbine 1215 where electrical power is generated from the conversion of mechanical energy. The draw solution is then released from the first turbine 1215 to the heat exchanger 1211 along output turbine draw line 1210b. The feed solution used the feed solution chamber 1208 of the first osmotic pressure chamber 1205 is directed along output feed line 1212 to be combined with the output line 1210b as it proceeds through the heat exchanger 1211. The heat exchanger 1211 allows the residual heat from the used draw and feed solutions to pre-cool the circulated draw and feed solutions before being separated and re-used in the system.

Upon exit from heat exchanger 1211, the combined draw and feed solutions is transferred to a first separator 1215 via line 1213. In the first separator 1215, the combined feed and draw solutions are separated into water-rich diluted feed solution in feed separator chamber 1217 and ionic liquid-rich draw solution in draw separator chamber 1216 along a separator line. The feed solution is transferred from the feed separator chamber 1217 to first heat source 1219 via line 1218, and the heated feed solution used in the first osmotic pressure chamber 1205 is transferred to the feed pressure chamber 1206 from the first heat source 1219 along input feed line 1214. The ionic liquid-rich draw solution (or draw solution) formed in draw separator chamber 1216 of the first separator 1215 is directed along line 1201 to a second heat source 1202 and then along line 1203 after being heated to be input into the draw solution chamber 1208 of osmotic pressure chamber 1205 via line 1203.

A second osmotic pressure chamber 1220 with a pressure retarded osmosis (PRO) membrane 1222, a draw solution chamber 1223 filled with draw solution and a feed solution chamber 1221 filled with feed solution. With the increase in osmotic pressure using the above described draw solutions under the appropriate predetermined temperature and pressure settings, the first osmotic pressure chamber 1220 uses output draw line 1226a to direct the pressurized draw solution from the draw solution chamber 1223 to second turbine 1226b where electrical power is generated from the conversion of mechanical energy. The draw solution is then released from the second turbine 1226b to the heat exchanger 1211 along output turbine draw line 1226c. The feed solution used the feed solution chamber 1221 of the second osmotic pressure chamber 1220 is directed along output feed line 1225 to be combined with the output line 1226c as it proceeds through the heat exchanger 1211. The heat exchanger 1211 allows the residual heat from the used draw and feed solutions to pre-heat the circulated draw and feed solutions before being separated and re-used in the system.

Upon exit from heat exchanger 1211, the combined draw and feed solutions are transferred to a third heat source 1228 via line 1227, and then transferred to a second separator 1230 via line 1229. In the second separator 1230, the combined feed and draw solutions are separated into water-rich diluted feed solution in feed separator chamber 1231 and ionic liquid-rich draw solution in draw separator chamber 1232 along a separator line. The feed solution is transferred from the feed separator chamber 1231 to first cold sink 1234 via line 1233, and the cooled feed solution used in the second osmotic pressure chamber 1220 is transferred to the feed pressure chamber 1221 from the first cold sink 1234 along input feed line 1237. The ionic liquid-rich draw solution (or draw solution) formed in draw separator chamber 1232 of the second separator 1230 is directed along line 1236a to a second cold sink 1235 and then along line 1236b after being cooled to be input into the draw solution chamber 1223 of osmotic pressure chamber 1220.

In FIG. 12B, the system 1299 uses both LCST-type and UCST-type draw solutions and has a first osmotic pressure chamber 1255 with a pressure retarded osmosis (PRO) membrane 1257, a draw solution chamber 1256 filled with draw solution and a feed solution chamber 1258 filled with feed solution. With the increase in osmotic pressure using the above described draw solutions under the appropriate predetermined temperature and pressure settings, the draw solution in the draw solution chamber 1256 of the first osmotic pressure chamber 1255 uses output draw line 1264a to direct the pressurized draw solution from the draw solution chamber 1256 to first turbine 1264b where electrical power is generated from the conversion of mechanical energy. The draw solution is then released from the first turbine 1264b along line 1264c and line 1262a to a first heat source 1263. The feed solution used the feed solution chamber 1258 of the first osmotic pressure chamber 1255 is directed along output feed line 1261 to be combined on line 1262a with the used draw solution fed to that line 1262a on the output line 1264c.

Upon exit from the first heat source 1263, the combined draw and feed solutions are transferred to a first separator 1267 via line 1262b. In the first separator 1267, the combined feed and draw solutions are separated into water-rich diluted feed solution in feed separator chamber 1268 and ionic liquid-rich draw solution in draw separator chamber 1269 along a separator line. The feed solution is transferred from the feed separator chamber 1268 to the heat exchanger 1271 and then onto to the feed solution chamber 1258 of the first osmotic pressure chamber 1255 via line 1262. The ionic liquid-rich draw solution (or draw solution) formed in draw separator chamber 1269 of the first separator 1267 is directed along line 1270 to the heat exchanger 1271 and then onto to draw solution chamber 1256 of the first osmotic pressure chamber 1255 via line 1260. The heat exchanger 1271 allows the residual cooling from the used draw and feed solutions to cool the circulated draw and feed solutions before being re-used in the system.

A second osmotic pressure chamber 1276 with a pressure retarded osmosis (PRO) membrane 1273, a draw solution chamber 1274 filled with draw solution and a feed solution chamber 1272 filled with feed solution. With the increase in osmotic pressure using the above described draw solutions under the appropriate predetermined temperature and pressure settings, the second osmotic pressure chamber 1276 uses output draw line 1278a to direct the pressurized draw solution from the draw solution chamber 1274 to second turbine 1278b where electrical power is generated from the conversion of mechanical energy. The draw solution is then released from the second turbine 1278b to a cold source 1294 along output turbine draw line 1278c and line 1295.

The feed solution used in the feed solution chamber 1272 of the second osmotic pressure chamber 1272 is directed along output feed line 1277 and line 1295 to be combined with the used draw solution on the output line 1278c as it proceeds to the cold source 1294 along line 1295.

Upon exit from the cold source 1294, the combined draw and feed solutions are transferred to a second separator 1290 via line 1293. In the second separator 1290, the combined feed and draw solutions are separated into water-rich diluted feed solution in feed separator chamber 1292 and ionic liquid-rich draw solution in draw separator chamber 1291 along a separator line. The feed solution is transferred from the feed separator chamber 1292 via line 1287 to the heat exchanger 1271 and onto a second heat source 1283 via line 1282. From the second heat source 1283, the heated feed solution is transferred to the feed pressure chamber 1272 of the second osmotic pressure chamber 1220 along input feed line 1286. The ionic liquid-rich draw solution (or draw solution) formed in draw separator chamber 1291 of the second separator 1290 is directed along line 1280 to the heat exchanger 1271, and then to a third heat source 1284 along line 1281. Upon being heated, the heated draw solution is input into the draw solution chamber 1274 of osmotic pressure chamber 1276 via line 1285. The heat exchanger 1271 allows the residual heat from the used draw and feed solutions to pre-heat the circulated draw and feed solutions before being re-used in the system.

Compared with prior art PRO systems utilizing osmotic power gradients between seawater (or RO brine) and river water (or municipal wastewater), the present invention has comparable or higher osmotic pressure difference with less geographic location limitations, more affordable economic operations, and higher power densities. In addition, electrical energy produced in this system does not require the same level of solution pretreatment, intake and discharge energy outputs required in as prior art systems. The present invention actually harvests thermal energy through stimuli (thermal) regenerated concentration gradient instead of natural salinity gradients.

Compared with $CO_2$-$NH_3$ system that has also been discussed as a heat engine, the present invention is significantly different and more efficient than this known system. In $CO_2$-$NH_3$ regeneration, a solution is transitioned into a gas by decomposing a solute into $CO_2$ and NH3, and then re-dissolving these gases into water. This prior art system requires much more complex processes with high energy consumption and capital investment than the present invention.

Water evaporation is a key drawback to this $CO_2$-$NH_3$ prior art system as the more concentrated the draw solution to be regenerated, the more water will be evaporated in the liquid-gas phase separation. And, the more thermal energy will be consumed for water evaporation, which will be considered a loss of the system and thereby reduce the net power output of the system. The re-dissolution of $CO_2$ and $NH_3$ and the handling of $NH_3$ further hinders this prior art system's viability. In contrast, the present invention avoids these pitfalls by using only a liquid-liquid phase separation in the regeneration process, which avoids the problems with the prior $CO_2$-$NH_3$ system associated with decomposition, water evaporation and re-dissolution.

For instance, the liquid-liquid phase separation shown in the present invention is superior to liquid-solid and liquid-gas phase separations. The latter two regeneration methods involve two different phases that would increase the practical complexity of equipment in completely separating the two phases. The use of gas in the power system has the problem of the gas partially dissolving in water, while filtration in liquid-solid separation would likely result in clogging problems at high concentrations. The separation of two immiscible solutions shown in the present invention, compared to these prior art three phase systems, can be easily achieved in the market and would avoid the problems encountered by these more complicated systems.

The present invention is supported by liquid-liquid phase separation, which based on completely new principle of phase separation of LCST or UCST draw solutions. It is quantitatively and qualitatively different from other reported systems. Coupled with the liquid-liquid phase separation used in the present invention, a wide variety of thermally responsive draw solutions can be selected that possess the necessary LCST and UCST characteristics, although the most promising one are responsive electrolytes or responsive ionic liquids disclosed in the present invention such as responsive ionic liquids. Multiple draw solutions can be incorporated and used in the present invention to maximize the energy output.

Due to the larger molecular weight of the draw solutions used in the present invention, less draw agent back-diffusion is anticipated, which will preserve or enhance the osmotic pressure difference during PRO (or its alternatives) process. Similarly, compared with inorganic salts, less expensive and more available membranes with larger permeability can be used with the novel draw solutions of the present invention without compromising selectivity, effectiveness or efficiency. Therefore, higher osmotic power density can be achieved at lower costs using the present invention.

In the present invention, (for example, the systems in FIGS. 7-11), the heat sources can use low grade heat energy sources including industrial waste heat, solar thermal, or geothermal to stimulate phase transitions of the draw solutions. And, the cold sink or cold source thermal energy can be extracted from ambient seawater, river water, deep seawater or shallow seawater sources.

It will be readily apparent that the description set forth herein of the osmotic power systems is provided for purposes of illustration only and not of limitation, and that the invention is limited only by the appended claims. For example, the schematic diagrams shown in FIGS. 1, 7-11, 12A-B do not itemize or describe in detail the dimensions, shapes, sizes, inputs or outputs, or exact specification of the identified elements (e.g. osmosis chamber, permeable membrane, heat exchange, heat source, cold sinks), which are all understood to exit and be within the scope of the invention as described and claimed. Furthermore, size and shapes of piping as well as location, sizes and specifications for pumps, intakes, valves, reservoirs, and separators are not described in detail, but such details are understood to be varied or modifiable while still complying with the scope of the invention set forth herein and covered by the claims. For instance, in FIGS. 7-11 (and possibly others), the PRO membrane unit can be replaced by an RED or CM unit to achieve the same purpose. Although we illustrate the salinity energy harvesting using the thermally responsive materials/compounds with PRO technology, other methods including RED and CM can be used in the same processes by simply replacing the PRO unit while keep other parts of the processes the same.

What is claimed is:
1. A method of harvesting energy, comprising the steps of:
a. producing an osmotic pressure gradient in an osmotic pressure chamber using a thermally responsive solution, wherein the thermally responsive solution sepa- rates into an ionic liquid-rich phase and a water-rich phase at a critical solution temperature,
b. heating or cooling the thermally responsive solution to promote phase separation of the thermally responsive solution into said ionic liquid-rich phase and said water-rich phase,
c. directing the thermally responsive solution to a separator which separates the thermally responsive solution into said ionic liquid-rich phase and said water-rich phase,
d. heating or cooling one or more of the ionic liquid-rich phase and the water-rich phase, wherein the heating or cooling is performed in steps b and c using one or more heat sources and/or one or more cold sinks,
e. using the ionic liquid-rich phase as a draw solution,
f. using a feed solution comprising water, wherein the water is the water-rich phase derived from the thermally responsive solution, and
g. harvesting the energy created by the osmotic pressure gradient using pressure retarded osmosis, reverse electrodialysis, or capacitive mixing, wherein the energy is generated using a turbine.

2. The method of claim 1, wherein the thermally responsive solution has an upper critical solution temperature (UCST) and separates into said ionic liquid-rich phase and said water-rich phase when temperature is below the UCST or has a lower critical solution temperature (LCST) and separates into said ionic liquid-rich phase and said water-rich phase when temperature is above the LCST.

3. The method of claim 1, wherein the thermally responsive solution has an upper critical solution temperature (UCST).

4. The method of claim 3, wherein the water-rich phase has an ionic liquid concentration lower than the ionic liquid-rich phase when temperature is below UCST, while the two phases become completely miscible when temperature is at or above UCST.

5. The method of claim 4, wherein the thermally responsive solution is cooled to promote separation in step b and one or more of the ionic liquid-rich phase and the water-rich phase is heated in step d.

6. The method of claim 3, wherein the thermally responsive solution having the UCST comprises protonated betaine bis(trifluoromethylsulfonyl)imide ([Hbet][Tf$_2$N]).

7. The method of claim 1, wherein the thermally responsive solution has a lower critical solution temperature (LCST).

8. The method of claim 7, wherein the water-rich phase has a solute concentration lower than the ionic liquid-rich phase when temperature is above LCST, wherein two phases become completely miscible when temperature is at or below LCST.

9. The method of claim 8, wherein the thermally responsive solution is heated in step b to promote separation and one or more of the ionic liquid-rich phase and the water-rich phase is cooled in step d.

10. The method of claim 7, wherein the thermally responsive solution having the LCST comprises tetrabutylphosphonium 2,4-dimethylbenzenesulfonate (P4444 DMBS).

11. A system for generating osmotic energy, comprising:
a first heat source that heats a water-rich feed solution, said first heat source raises the temperature of said water-rich feed solution above an upper critical solution temperature threshold;
a second heat source that heats an ionic-rich draw solution, said second heat source raises the temperature of said ionic-rich draw solution above an upper critical solution temperature threshold;
an osmosis pressure chamber having an osmosis permeable membrane that separates a feed solution chamber coupled to said first heat source from a draw solution chamber coupled to said second heat source, said osmosis pressure chamber creating an osmotic pressure gradient between the water-rich feed solution in said feed solution chamber and the ionic-rich draw solution in said draw solution chamber, said osmotic pressure gradient causing a water flux into the draw solution in the draw solution chamber;
a turbine coupled to said draw solution chamber and capable of receiving the draw solution, said turbine producing electrical energy by the application of the draw solution;
a cold sink that receives the draw solution after use by the turbine and the feed solution after use in the feed solution chamber of said osmosis pressure chamber, said cold sink lowers the temperature of said draw solution and said feed solution below the upper critical solution temperature threshold; and,
a separator receiving colder draw solution and cooled feed solution from said cold sink, said separator supporting a liquid-liquid phase separation of said ionic-rich draw solution from said water-rich feed solution, said separator coupled to said first heat source to provide said water-rich feed solution and said separator coupled to said second heat source to provide said ionic-rich draw solution.

12. The system of claim 11, wherein said first or second heat sources are low grade heat sources, wherein the low grade heat sources are selected from solar, geothermal, and industrial heat.

13. The system of claim 11, wherein said draw solution is protonated betaine bis(trifluoromethylsulfonyl)imide ([Hbet] [Tf$_2$N]).

14. The system of claim 11, wherein said upper critical solution temperature is at least 65° C.

15. The system of claim 11, wherein one or more heat exchangers are used to preheat draw and feed solutions.

16. A system for generating osmotic energy, comprising:
a first cold sink source that cools a water-rich feed solution, said first cold sink source lowers the temperature of said water-rich feed solution below a lower critical solution temperature threshold;
a second cold sink source that cools an ionic-rich draw solution, said second cold sink source lowers the temperature of said ionic-rich draw solution below said lower critical solution temperature threshold;
an osmosis pressure chamber having an osmotic permeable membrane that separates a feed solution chamber coupled to said first cold sink source from a draw solution chamber coupled to said second cold sink source, said osmosis pressure chamber creating an osmotic pressure gradient between the water-rich feed solution in said feed solution chamber and the ionic-rich draw solution in said draw solution chamber, said osmotic: pressure gradient causing a water flux into the draw solution in the draw solution chamber;
a turbine coupled to said draw solution chamber and capable of receiving the draw solution, said turbine producing electrical energy by the application of the draw solution;
a heat source that receives the draw solution after use by the turbine and the feed solution after use in the feed solution chamber of said osmosis pressure chamber, said heat source raises the temperature of said draw solution and said teed solution above the lower critical solution temperature threshold; and, a separator receiving heated draw solution and heated feed solution from said heat source, said separator supporting a liquid-liquid phase separation of said ionic-rich draw solution from said water-rich feed solution, said separator coupled to said first cold sink source to provide said water-rich feed solution and said separator coupled to said second cold sink source to provide said ionic-rich draw solution.

17. The system of claim 16, wherein said heat source uses a low grade heat source, wherein the low grade heat source is solar, geothermal or industrial heat.

18. The system of claim 16, wherein said draw solution is tetrabutylphosphonium 2,4- dimethylbenzenesulfonate (P4444 DMBS).

19. The system of claim 16, wherein said lower critical solution temperature is no greater than 35' C.

20. The system of claim 16, wherein one or more heat exchangers are used to cool the draw solution or the feed solution.

\* \* \* \* \*